United States Patent [19]

Scheinberg et al.

[11] Patent Number: 5,540,592
[45] Date of Patent: * Jul. 30, 1996

[54] TRAINING MANIKIN FOR CARDIO-PULMONARY RESUSCITATION

[75] Inventors: Samuel Scheinberg, Lincoln City, Oreg.; David E. Moeller, Bainbridge Island, Wash.

[73] Assignee: The Seaberg Company, Inc., South Beach, Oreg.

[ * ] Notice: The portion of the term of this patent subsequent to Mar. 22, 2011, has been disclaimed.

[21] Appl. No.: 104,062

[22] PCT Filed: Aug. 12, 1993

[86] PCT No.: PCT/US93/07577

§ 371 Date: Aug. 12, 1993

§ 102(e) Date: Aug. 12, 1993

[87] PCT Pub. No.: WO94/05000

PCT Pub. Date: Mar. 3, 1994

Related U.S. Application Data

[63] Continuation-in-part of Ser. No. 929,331, Aug. 12, 1992, Pat. No. 5,295,835.

[51] Int. Cl.⁶ .................................................. G09B 23/28
[52] U.S. Cl. ................................................................. 434/265
[58] Field of Search .................................... 434/265, 262, 434/267

[56] References Cited

U.S. PATENT DOCUMENTS

| | | |
|---|---|---|
| 3,049,811 | 8/1962 | Ruben . |
| 3,068,590 | 12/1962 | Padellford . |
| 3,199,225 | 8/1965 | Robertson et al. . |
| 3,209,469 | 10/1965 | James . |
| 3,276,147 | 10/1966 | Padellford . |
| 3,520,071 | 7/1970 | Abrahamson et al. . |
| 3,562,924 | 2/1971 | Baerman et al. . |
| 3,736,362 | 5/1973 | Laerdal . |
| 3,859,737 | 1/1975 | Laerdal . |
| 3,916,535 | 11/1975 | Hewson . |
| 3,994,075 | 11/1976 | Kohnke . |
| 4,001,950 | 1/1977 | Blumenssaadt . |
| 4,194,303 | 3/1980 | Heller . |
| 4,331,426 | 5/1982 | Sweeney ................................ 434/265 |
| 4,484,896 | 11/1984 | Kohnke ................................ 434/265 |
| 4,611,998 | 9/1986 | Ramamurthy ........................ 434/265 |
| 4,797,104 | 1/1989 | Laerdal et al. ...................... 434/265 |
| 4,801,268 | 1/1989 | Kohnke ................................ 434/265 |
| 4,850,876 | 7/1989 | Lutaenko et al. ................... 434/265 |
| 4,984,987 | 1/1991 | Brault et al. . |
| 5,055,052 | 10/1991 | Johnsen ................................ 434/265 |
| 5,295,835 | 3/1994 | Scheinberg et al. ................. 434/265 |
| 5,330,514 | 7/1994 | Egelandsdal et al. ............... 434/265 |

OTHER PUBLICATIONS

Beck Airway Airflow Monitor Mark VI—Available prior to 1992.

*Primary Examiner*—Gene Mancene
*Assistant Examiner*—Jeffrey A. Smith
*Attorney, Agent, or Firm*—Chernoff, Vilhauer, McClung & Stenzel

[57] ABSTRACT

A training manikin for use in teaching students to perform cardio-pulmonary resuscitation includes a head, a neck, and a torso molded integrally of a resilient material allowing flexure of the neck and providing realistic resistance to compression of the torso in simulating external heart massage. An audible signal device indicates adequate chest compression. A tubular airway passage includes a restrictor and a device for indicating sufficient air flow, and can receive obstructors. A cavity in the torso holds a smaller, infant-size similar manikin. The manikin may have a tough watertight skin surrounding a core of resilient microporous foam of lesser density. One embodiment of the invention includes a ball-and-socket joint articulating the head portion with the neck portion.

22 Claims, 7 Drawing Sheets

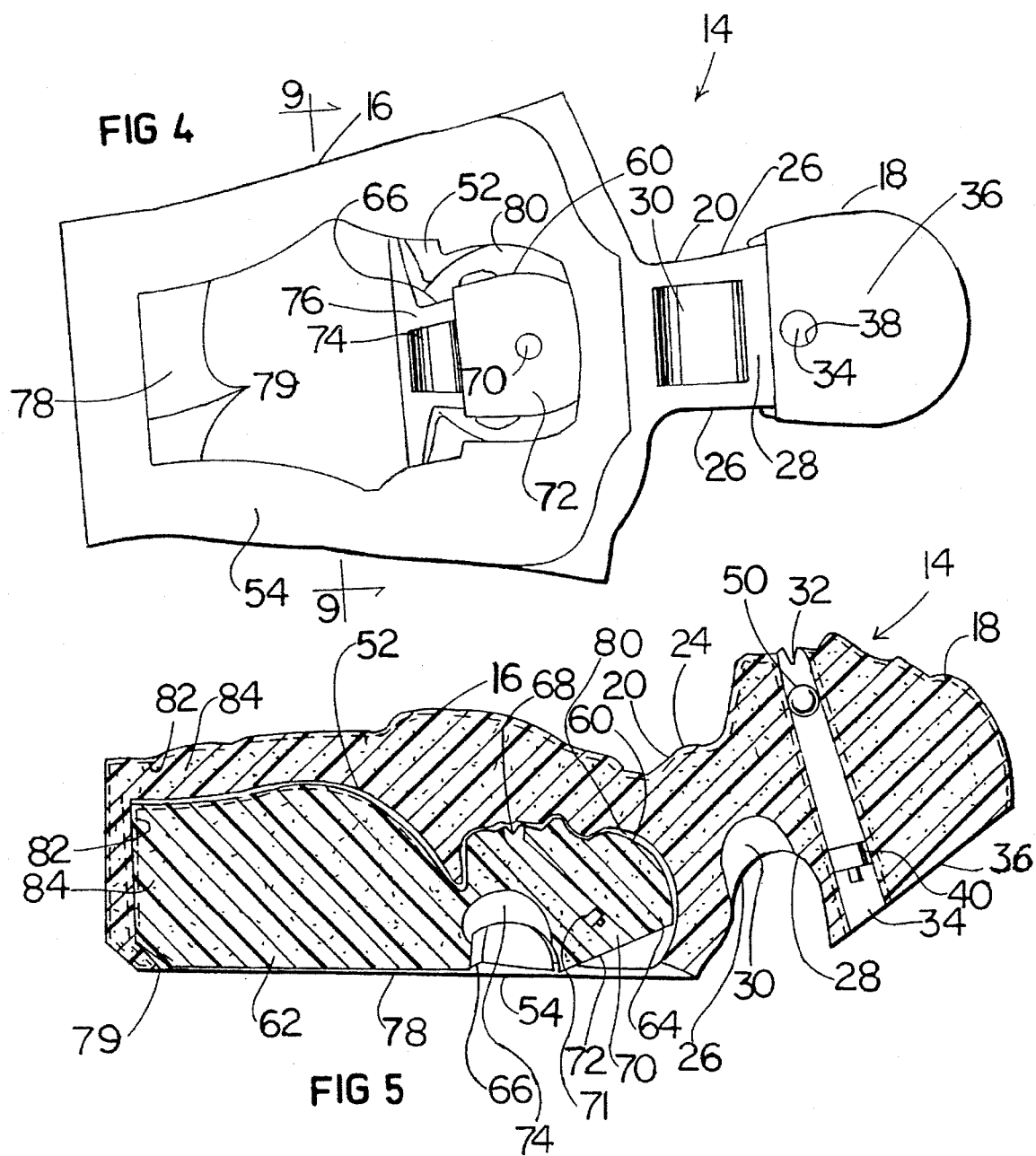

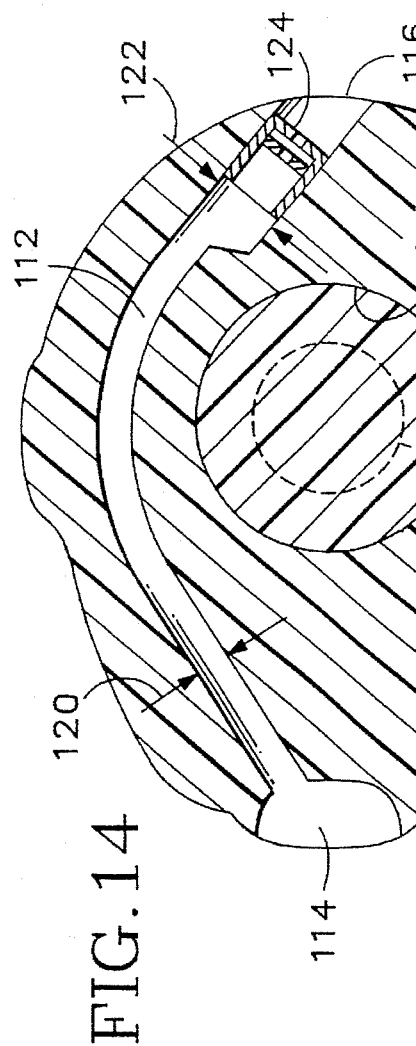
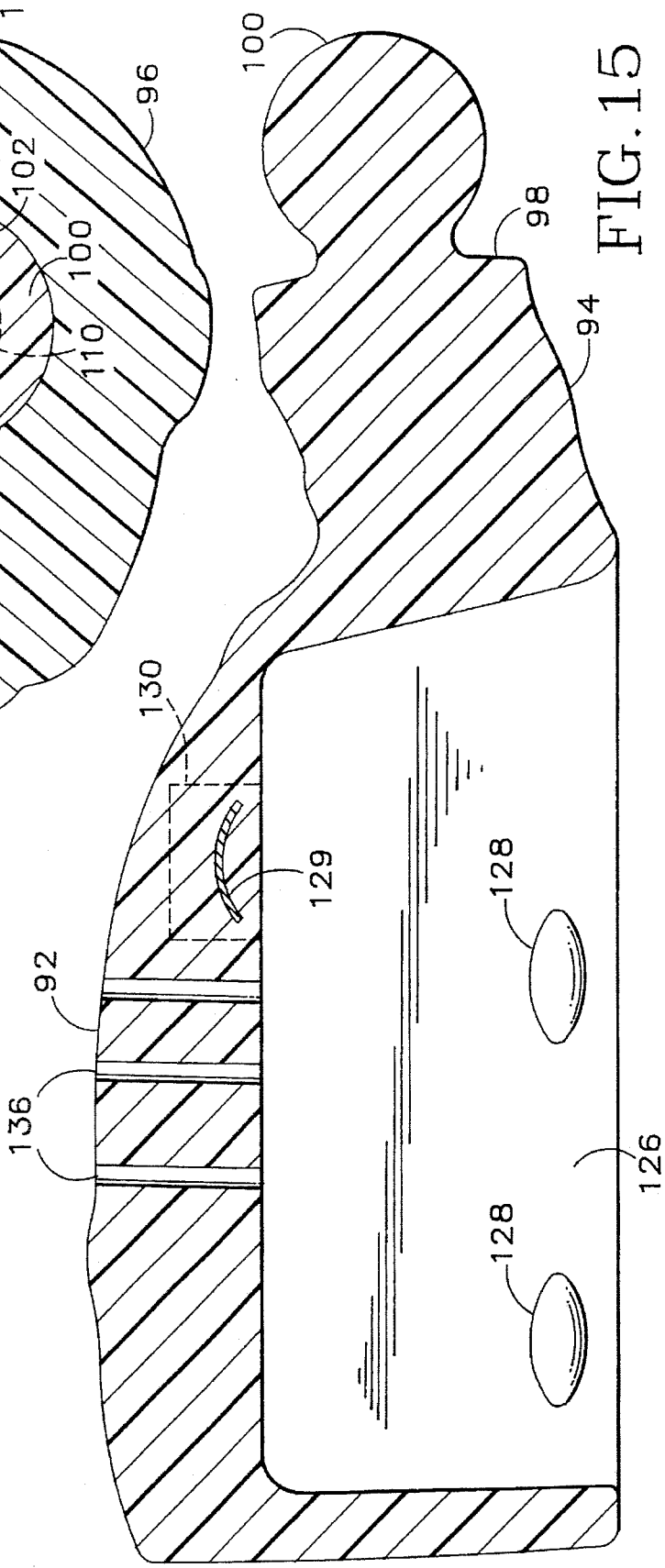
FIG. 14
FIG. 15

TRAINING MANIKIN FOR CARDIO-PULMONARY RESUSCITATION

This is a continuation-in-part of application Ser. No. 07/929,331, filed Aug. 12, 1992, which is now U.S. Pat. No. 5,295,835.

BACKGROUND OF THE INVENTION

The present invention relates to training individuals to perform cardio-pulmonary resuscitation and relates particularly to a manikin useful in providing such training.

Manikins have been used for years for training individuals to perform mouth-to-mouth artificial respiration and closed chest heart massage, known as cardiopulmonary resuscitation, or CPR, and for instruction in rescue breathing where heart failure is not a factor. In the past such manikins have been built in several pieces often including hollow shells of somewhat flexible and resilient materials, with various tubes, bellows, air bladders, valves, and pressure sensors housed within the shells. Articulation of head and neck portions has been accomplished through use of various swivel or hinge joints interconnecting separate parts. Such complexity of manikins provides some realism in the simulation of performing rescue breathing and CPR using such manikins, but is likely to add considerably to the initial cost and to the cost of maintaining such manikins.

The complexity of such previously available manikins thus makes such manikins unaffordably expensive, and thereby creates an undesirable limitation on the availability of CPR training.

It is desirable, nevertheless, to provide some feedback to a CPR student as reassurance that sufficient chest compression is being accomplished to achieve effective cardiac compression, and that sufficient air flow is being provided.

Not only is it necessary to train would-be rescuers to perform CPR on adults, but it is also necessary to train them to resuscitate infants.

What is needed, then, is a CPR training manikin, on which mouth-to-mouth rescue breathing and closed chest heart massage can be practiced, which is inexpensive, durable, easily cleaned, and low in requirements for maintenance and repairs, and which provides for practicing techniques for revival of infants.

SUMMARY OF THE INVENTION

The present invention provides a CPR training manikin which is easily manufactured, cleaned, and maintained, and which is of uncomplicated structure, yet which affords the opportunity for a trainee to practice mouth-to-mouth rescue breathing and external cardiac compression. The CPR training manikin according to one embodiment of the present invention is primarily a unitary structure of molded foam plastic material in the shape of a human torso, neck, and head. A mouth communicates with a tubular airway through which a trainee can practice mouth-to-mouth rescue breathing.

The neck portion of the manikin according to such an embodiment the invention is of a design permitting elastic flexure with application of a reasonable amount of force, simulating the effort needed to flex the neck of a living person. In a preferred embodiment of the invention the head and torso are articulated by a ball-and-socket joint permitting the head to be moved to demonstrate techniques necessary for rescue breathing.

In a preferred embodiment of the invention a restrictor is provided in the tubular airway to provide some resistance to simulate internal pressure opposing breathing into a victim in performing rescue breathing.

In a preferred embodiment of the invention the manikin is molded of micro-cellular foam plastic such as urethane, with a tough, waterproof skin portion formed in contact with the surfaces of a mold, and a core portion of lesser density contained within the skin, providing for compressibility of the torso portion of the manikin.

A preferred embodiment of the invention includes an adult-size manikin defining a cavity within its torso portion, with a second manikin representing the torso and head of an infant fitting removably within the cavity, to be removed when desired to train students in performing CPR on infants.

The foregoing and other objectives, features, and advantages of the invention will be more readily understood upon consideration of the following detailed description of the invention, taken in conjunction with the accompanying drawings. dr

BRIEF DESCRIPTION OF THE DRAWINGS

FIG. 4 is a bottom plan view of the manikin shown in FIG. 1.

FIG. 5 is a sectional view of the manikin shown in FIG. 1, taken along line 5—5.

FIG. 14 is a sectional view of the head portion of the training manikin shown in FIG. 12, taken along line 14—14 of FIG. 13.

FIG. 15 is a sectional view of the combined torso and neck portions of the training manikin shown in FIG. 12, taken along line 15—15, at an enlarged scale.

DETAILED DESCRIPTION OF A PREFERRED EMBODIMENT

Figure 1:
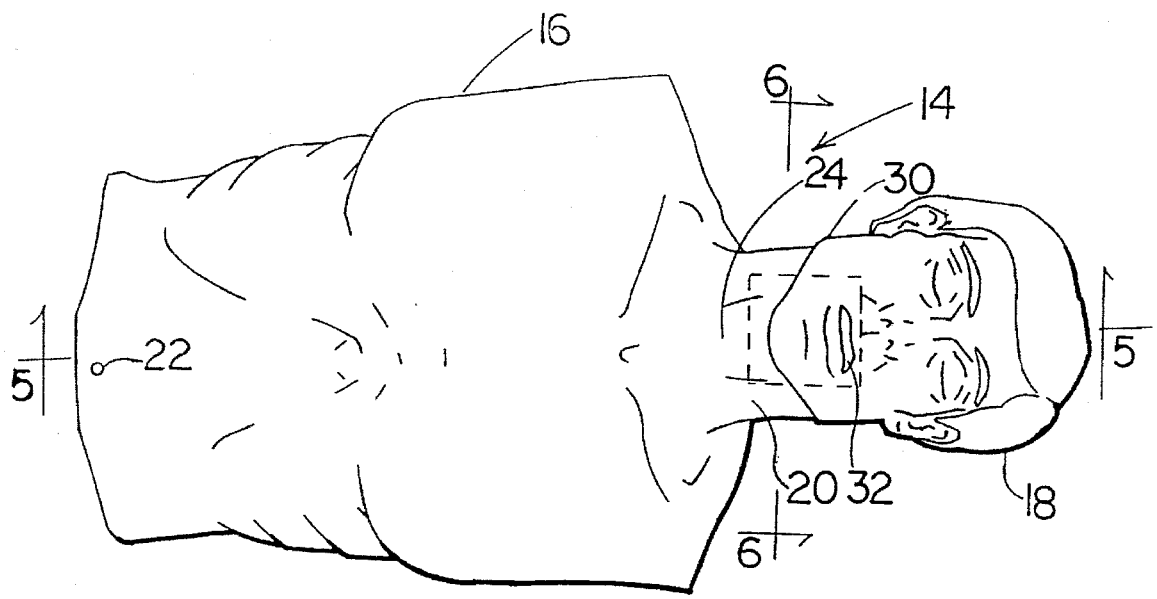
FIG. 1 is a top view of a cardio-pulmonary resuscitation training manikin embodying the present invention in a normal position simulating a victim needing rescue breathing or cardio-pulmonary resuscitation.

Referring now to the drawings which form a part of the disclosure herein, a training manikin 14 shown in FIGS. 1–4 includes a torso portion 16, a head portion 18, and a neck portion 20 interconnecting the head 18 with the torso 16. The torso portion 16 is preferably a representation of the shape of an adult human torso, lifelike in shape, and extending upwards from just below the location of the navel 22, but omitting the arms. The torso 16, because it extends down to the navel 22, is useful in teaching the Heimlich maneuver used for pneumatically clearing an obstruction from a person's airway.

Figure 2:
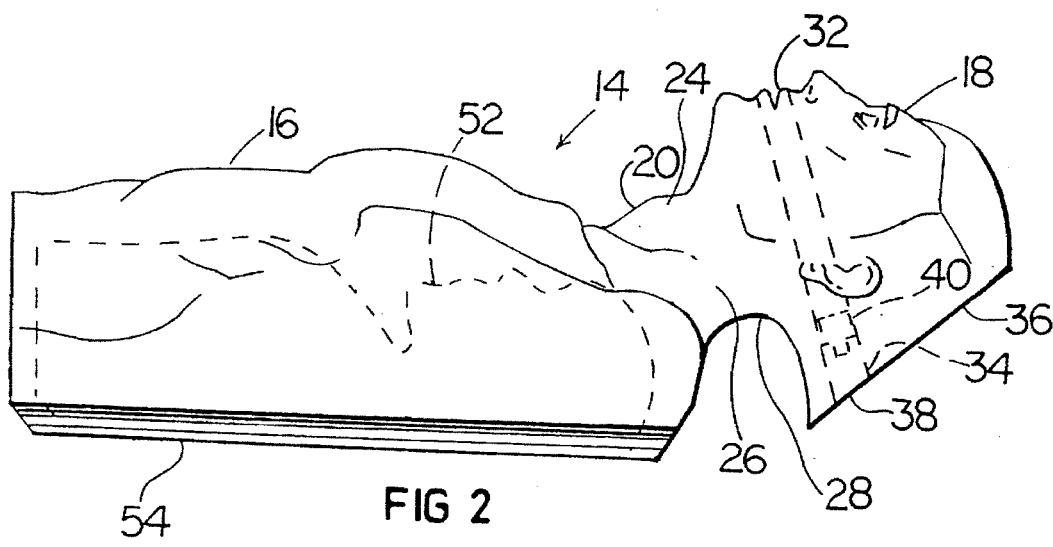
FIG. 2 is a side elevational view of the manikin shown in FIG. 1.
Figure 3:
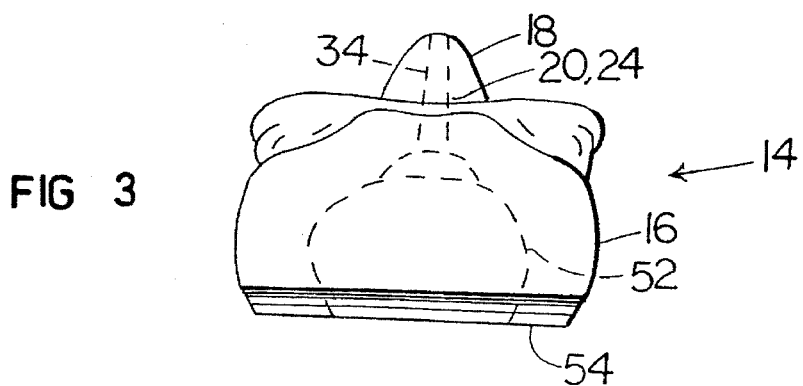
FIG. 3 is an end elevational view of the manikin shown in FIG. 1.
Figure 6:
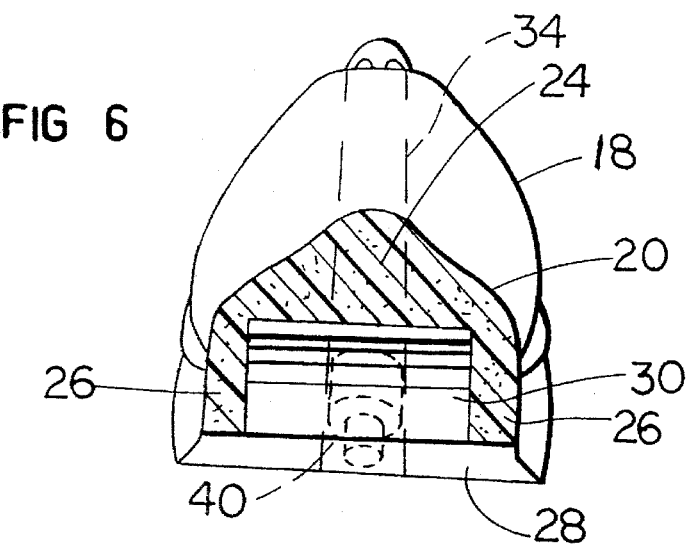
FIG. 6 is a sectional view of the manikin shown in FIG. 1, taken along the line 6—6.
Figure 7:
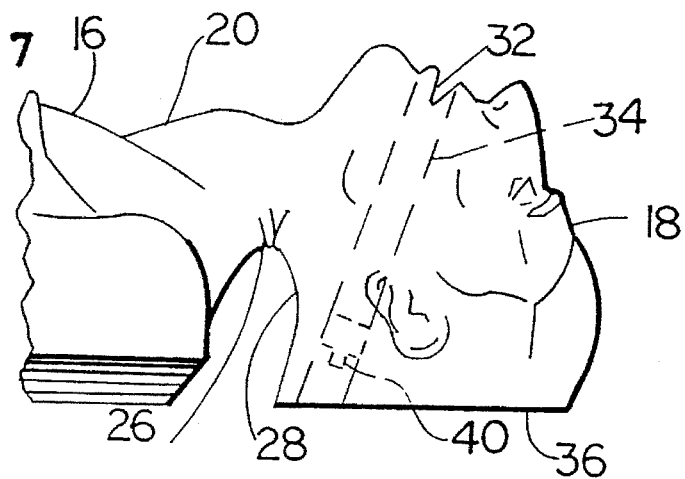
FIG. 7 is a detail view of a portion of the manikin shown in FIG. 2, with the head of the manikin tilted back to simulate opening a victim's airway.
Figure 8:
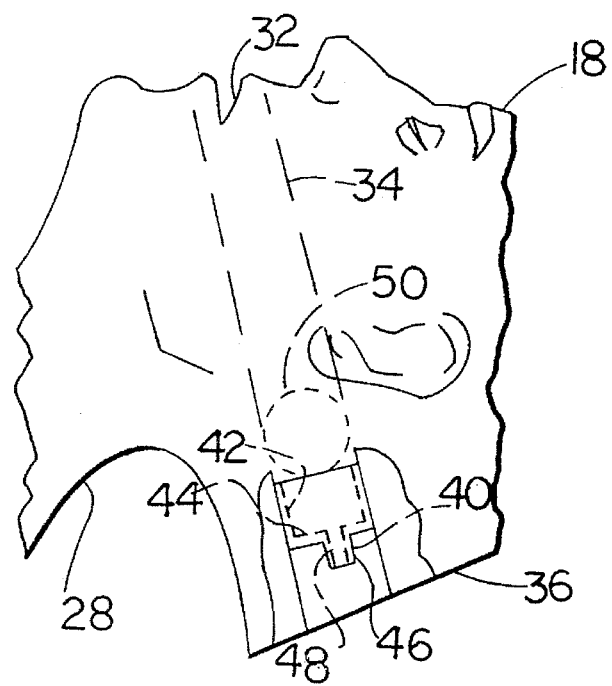
FIG. 8 is a detail view, at an enlarged scale, showing part of the head portion of the manikin shown in FIG. 1, including an airway restrictor.

The neck portion 20 is generally lifelike in shape in its front portion 24 and the two opposite lateral portions 26 extending rearwardly on each side from the front portion 24, as may be seen in FIGS. 1 and 2, but the back side 28 of the neck is not lifelike in shape. Instead, the back side 28 is generally concave, as may be seen best in FIG. 2, and defines a semi-cylindrical cavity 30 best seen in FIGS. 4, 5, and 6. As may be seen best in FIG. 6, the lateral portions 26 and the front portion 24 provide a structure in the general form of an inverted "U" shape, allowing the neck to flex so that the head can be tilted rearwardly, elevating the chin, to the position shown in FIG. 7.

The head portion 18 includes a mouth 32 defining an opening which communicates with a tubular airway 34 extending rearwardly from the Mouth 32 toward a generally planar back side 36 of the head. The back side 36 is inclined forward relative to the head portion 18, that is, from the location of an imaginary vertical plane which would pass through the head of a standing person. This provides an additional benefit of reinforcing instruction in elevating a victim's jaw and tilting the head rearward to provide an open airway, since when the head 18 is in the proper position the back side 36 is parallel or coplanar with the back side 54 of the torso 16. An airway opening 38, which is the opposite end of the airway 34 communicating with the mouth 32, is located on the inclined back side 36 as shown in FIG. 4.

Located within the tubular airway 34 is a restrictor 40, which is preferably held in place by friction. The restrictor 40 includes a generally cylindrical wall 42, a base 44, and a neck 46. The neck 46 and base 44 define an orifice 48 whose size, for example a diameter of about 0.187 inch, provides a restriction of the flow of air through the airway 34 to simulate the normal resistance to forcing air into a person during cardio-pulmonary resuscitation. The wall 42 and base 44 of the restrictor 40 together define a cup-like receptacle facing toward the mouth 32, and an obstructor ball 50 may be inserted into the airway 34 through the mouth 32 to simulate blockage of a victim's airway. Such an obstructor ball 50 can be removed practically from the tubular airway, but if not removed would lodge in the cup-like receptacle defined by the wall 42 and base 44 of the restrictor 40. An obstructor ball 50 may be of resilient foam plastic material, of a size which fits snugly in the airway 34 but may easily be placed into the airway through the mouth 32.

Figure 9:
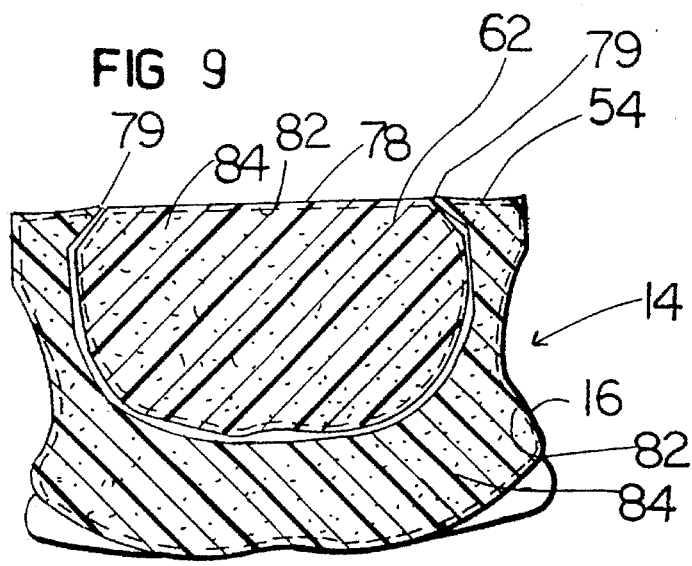
FIG. 9 is a sectional view of the manikin shown in FIG. 4, taken along line 9—9 thereof.
Figure 10:
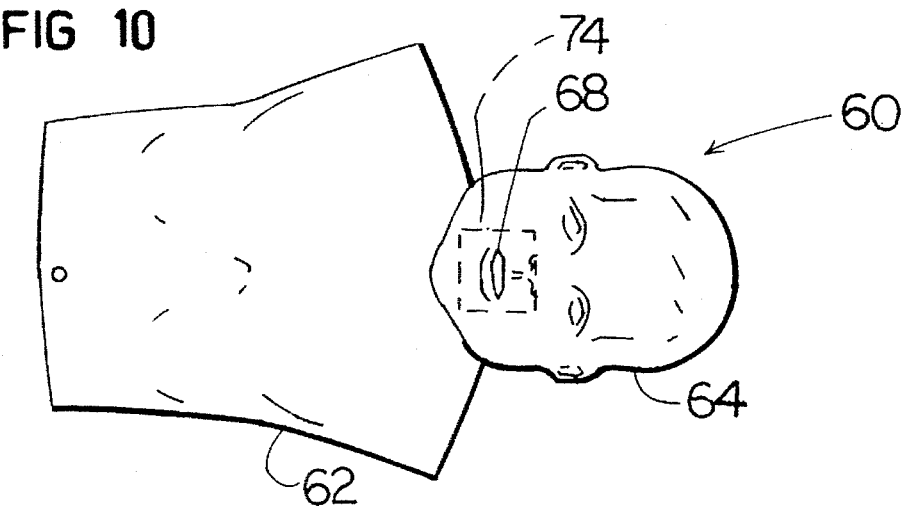
FIG. 10 is a top plan view of the infant-size manikin shown in FIG. 4.
Figure 11:
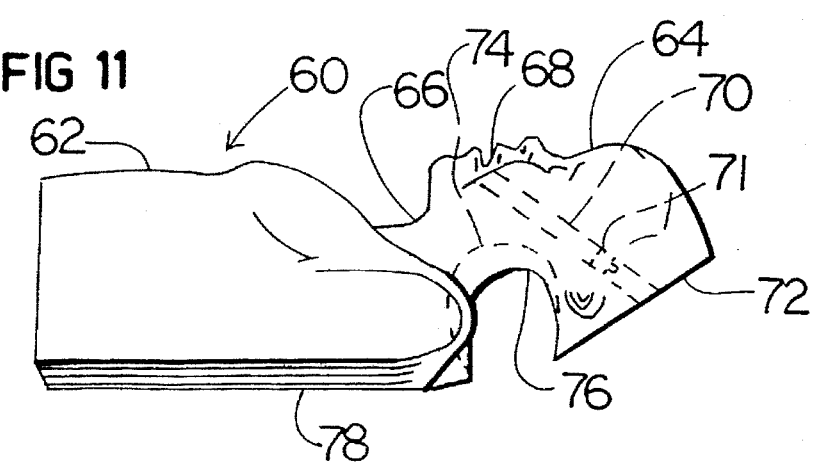
FIG. 11 is a side elevational view of the infant-size manikin shown in FIG. 10.
Figure 12:
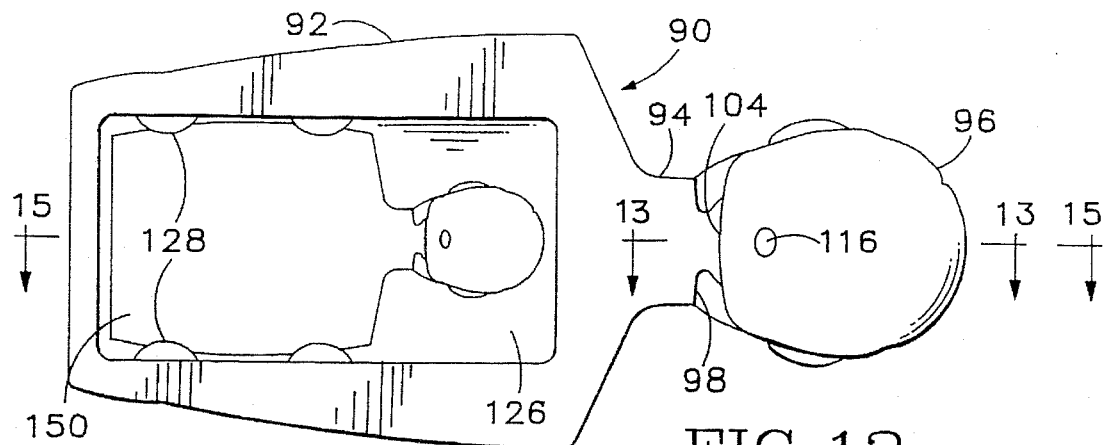
FIG. 12 is a rear view of a cardio-pulmonary resuscitation training manikin which is a further embodiment of the present invention.

The torso portion 16 of the manikin 14 includes a body cavity 52 shown in FIGS. 2, 4, and 9. The body cavity 52 is open toward a back side 54 of the torso portion 16, as shown in FIG. 4. An infant-size training manikin 60 is removably located within the body cavity 52 so that both the adult-size manikin 14 and the infant-size manikin can be transported and stored in a space no greater than needed for the adult-size manikin alone.

The infant-size manikin 60 includes a torso portion 62 which is significantly smaller than the torso portion 16, and which fits snugly within the body cavity 52, whose shape corresponds closely to that of the torso portion 62 of the infant-size manikin. The infant-size manikin 60 also includes a head portion 64 connected with the torso portion 62 by a neck portion 66. The head portion 64 is similar to the head portion 18, except for its smaller size, but is preferably shaped to have the appearance of the head of an infant. The head portion 64 includes a mouth 68 which is open and communicates with a tubular airway 70 extending rearwardly within the head portion 64 from the mouth 68 and similar to the tubular airway 34 of the manikin 14, except that the mouth 68 and tubular airway 70 are smaller in the infant-size manikin 60. A restrictor 71, similar to but smaller than the restrictor 40, is located in the airway 70 to perform the same function as the restrictor 40 in the manikin 14. Because of the smaller size of an infant the orifice is preferably about 0.145 inch in diameter. A back side 72 of the head portion 64 is inclined forward in the same manner as the back side 36 of the head 18 of the manikin 14.

The neck portion 66 of the infant-size manikin 60 is also similar to the neck portion 20 of the manikin 14, and includes a cavity 74 defined in the back side 76 of the neck portion 66, so that the neck portion 66, like the neck portion 20, has a U-shaped cross section making the neck portion 66 readily flexible to tilt the head portion 64 with respect to the torso portion 62.

The torso portion 62 preferably includes a generally planar back side 78 which extends generally coplanar with the back side 54 of the torso portion 16 of the manikin 14 when the infant-size manikin 60 is held within the body cavity 52. Portions of the back side 54 of the torso 16 of the manikin 14 defining the opening to the body cavity 52 include peripheral edges 79 which wrap partially around the torso portion 62 of the infant-size manikin 60 holding the infant-size manikin 60 snugly within the body cavity 52. The body cavity 52 provides slightly more space, as at 80, around the head portion 64, however, so that the head portion 64 may be grasped to pull the infant-size manikin from the body cavity 52 for use.

The training manikin 14 and the infant-size manikin 60 are of similar construction, preferably of molded microcellular urethane foam which when molded forms a tough, watertight, non-porous skin 82 adjacent the mold surfaces, while a porous micro-cellular foam core 84 of lesser density is formed within portions of the manikin 14 or 16 which are spaced somewhat apart from the mold cavity surfaces. Formation of the skin 82 may be enhanced, if desired, by spraying the interior surfaces of the mold cavity with a suitable urethane composition prior to filling the remainder of the mold cavity with a self-blowing urethane foam composition.

While other compositions may be found which would work equally well, one preferred composition which has been found to perform well is a water blown polyester based polyol system of polymeric material producing an integrally skinned micro-cellular polyurethane foam structure. Such material is available from Cook Composites & Chemicals of Port Washington, Wis., under Stock No. 030-2524/030-

2067. This is a two-part system including a polyester based polyol part and an isocyanate part. Such material, when molded according to the manufacturer's instructions, produces a skin layer 82 which is smooth and easily cleaned and suitably thick to resist damage during use of a cardio-pulmonary resuscitation training manikin such as the manikins 14 and 60 without rupture of the skin 82. Such a skin optimally has a hardness of about Shore 30A. At the same time, the micro-cellular foam core 84 is resilient, yet adequately resistant to pressure to closely simulate the flexibility and limited compressibility of a human torso during administration of cardio-pulmonary resuscitation efforts. The micro-cellular foam density may be in the range of 1 to 10 pounds per cubic foot, and is preferably about 3.5 lb/ft$^3$ in density to provide the correct amount of resiliency.

The training manikin 14 can be used either with or without removal of the infant-size manikin 60 from the body cavity 52. Greater flexibility of the chest, to simulate a smaller person, is provided when the infant-size manikin 60 is removed, and greater resistance to chest pressure, as with a heavier-framed person is simulated by leaving the infant-size manikin 60 in the body cavity 52 during compression by a CPR trainee. The infant-size manikin 60 may be used once removed from the body cavity 52, to provide training for application of CPR to an infant.

A second embodiment of the invention is shown in FIGS. 12–15, where a training manikin 90 includes a torso portion 92 combined with a neck portion 94 as an integral structure, while a head portion 96 is a separate structure. The head portion 96 is articulated with the neck portion 94 by a ball-and-socket joint including a ball 100 extending from the upper end 98 of the neck portion 94 and matingly engaged within a socket 102 defined in the bottom 104 of the head portion 68. The socket 102 surrounds and is in contact with more than half of the substantially spherical surface of the ball 100, thus securely attaching the head portion 96 to the neck portion 94, while allowing the head portion 96 to be rotated about a generally vertical axis 106 extending through the ball 100, so that the head portion 96 can be turned realistically from side to side with respect to the torso portion 92. Sufficient clearance is provided between the bottom 104 of the head portion 96 and the upper end 98 of the neck portion 94 to permit the head portion 96 to be tilted rearward with respect to the neck portion 94 through an angle 108 of, for example 27°, between the normal position of the head portion 96, shown in FIG. 13 in solid line, and the rearward-most tilted position possible, indicated in FIG. 13a.

Each of the two parts of the training manikin 90, the combined torso portion 92 and neck portion 94, and the head portion 96, is preferably molded, similar to the training manikin 14, of similar material, resulting in a smooth, tough, skin surface, and a compressible structure. This permits the ball 100 to be compressed sufficiently to fit through the opening 110 into the socket 102 defined in the bottom 104 of the head portion 96. The surfaces of the two portions of the training manikin 90 are sufficiently smooth, and slide easily enough with respect to each other, so that no additional lubrication is required nor desired to allow the head portion 96 to be turned side-to-side or to be tilted rearward.

Figure 13:
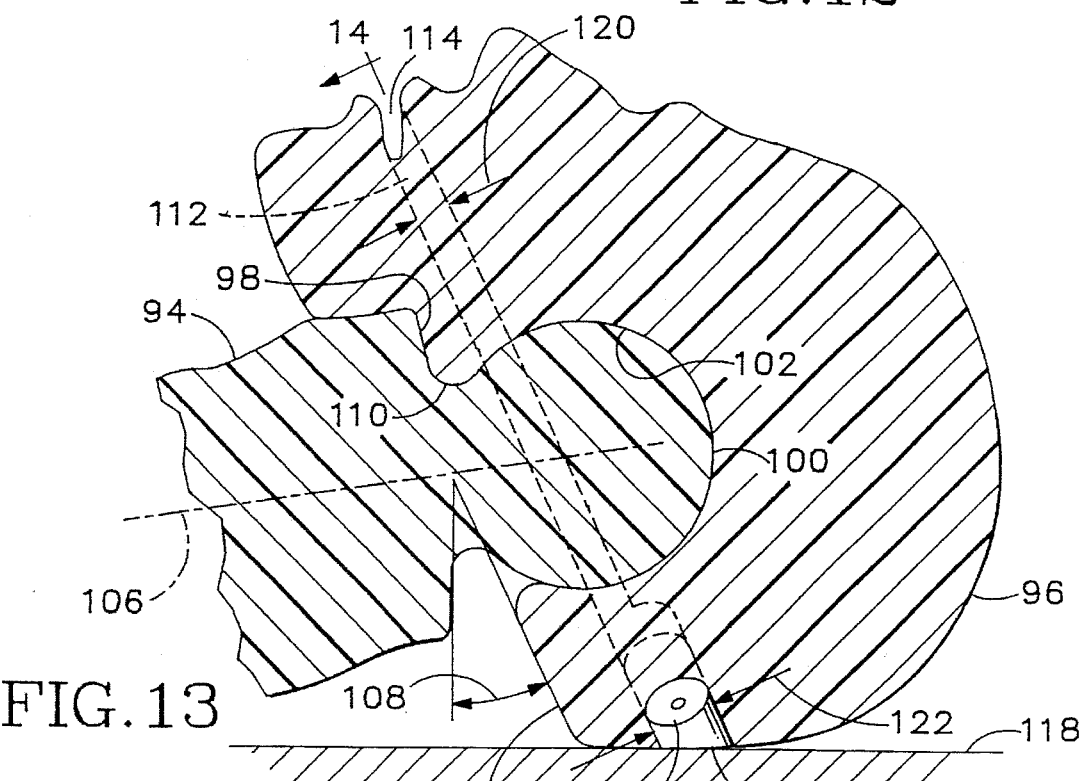
FIG. 13 is a sectional side view of the training manikin shown in FIG. 12, taken along line 13—13, at an enlarged scale.
Figure 13A:
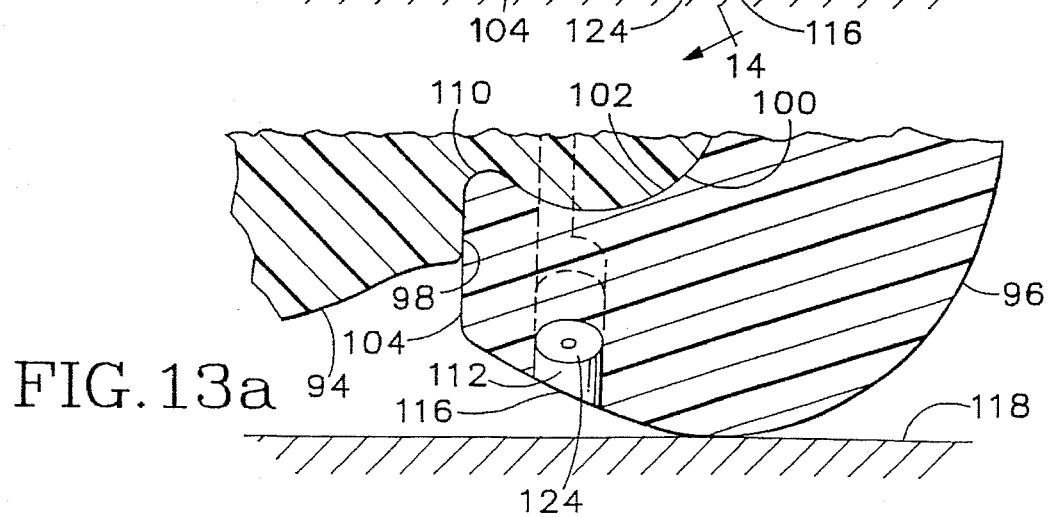
FIG. 13a is a view similar to a portion of FIG. 13, showing the head of the training manikin tilted rearwardly.

As may be seen best in FIG. 14, a tubular airway 112 extends arcuately rearwardly from the mouth 114, bypassing the socket 102, and continuing to an airway opening 116 on the back side of the head portion 96. The airway opening 116 is located so that when the head portion 96 is tilted forward to a normal attitude such as might be expected when a person lies on his or her back, the airway opening 116 will be occluded by a horizontal surface such as a floor 118 on which the training manikin 90 is resting, as in FIG. 13. When the head portion 96 is in a rearwardly-tilted position as shown in FIG. 13a, however, the airway opening 116 is spaced apart from a horizontal surface on which the training manikin 90 is resting, clearing the airway opening 116 and simulating the position desired to provide a clear airway in a person requiring pulmonary resuscitation.

The airway 112 is preferably of ample size, the forward part having, for example, a diameter 120 of 0.375 inches (0.95 cm) while at the rear of the head portion 96 the airway is enlarged to a diameter 122 of, for example, 0.875 inches (2.22 cm). In order to teach realistically the pressure required for breathing into an actual patient, the airway 112 has a restrictor 124 mounted therein to provide resistance to breathing into the mouth 114 of the training manikin 90. Preferably the restrictor 124 at the same time provides an indication that a sufficient flow of air is being supplied by the trainee. For example, a device such as an airway air flow monitor, such as the Beck Airway Air Flow Monitor Mark VI, available from Great Plains Ballistics, Inc. of Lubbock, Tex., may be mounted within the airway as the restrictor 124. Such a device has two orifices, each having a diameter of approximately 0.12 inch (0.3 cm), spaced slightly apart from each other to provide an audible whistling sound as an indication that sufficient air flow through the airway 112 is being provided by a CPR trainee.

As with the training manikin 14, an obstructor ball 50 may be inserted into the airway 112 through the mouth 114 of the training manikin 90 to simulate blockage of a victim's airway and require a trainee to demonstrate procedures for removal of such a blockage.

Also as in the training manikin 14, a body cavity 126 is defined within the torso portion 92 to receive an infant-size training manikin 150 generally similar to the training manikin 90, except for being smaller, omitting a body cavity, and having a child's facial features. In order to provide additional security of the infant-size training manikin 150 within the body cavity 126, protuberances 128 are provided on the interior surface of the body cavity 126. For example, there may be two such protuberances 128 located on each side of the interior of the body cavity 126 to engage the infant-size training manikin 150 to help retain it within the body cavity.

Figure 16:
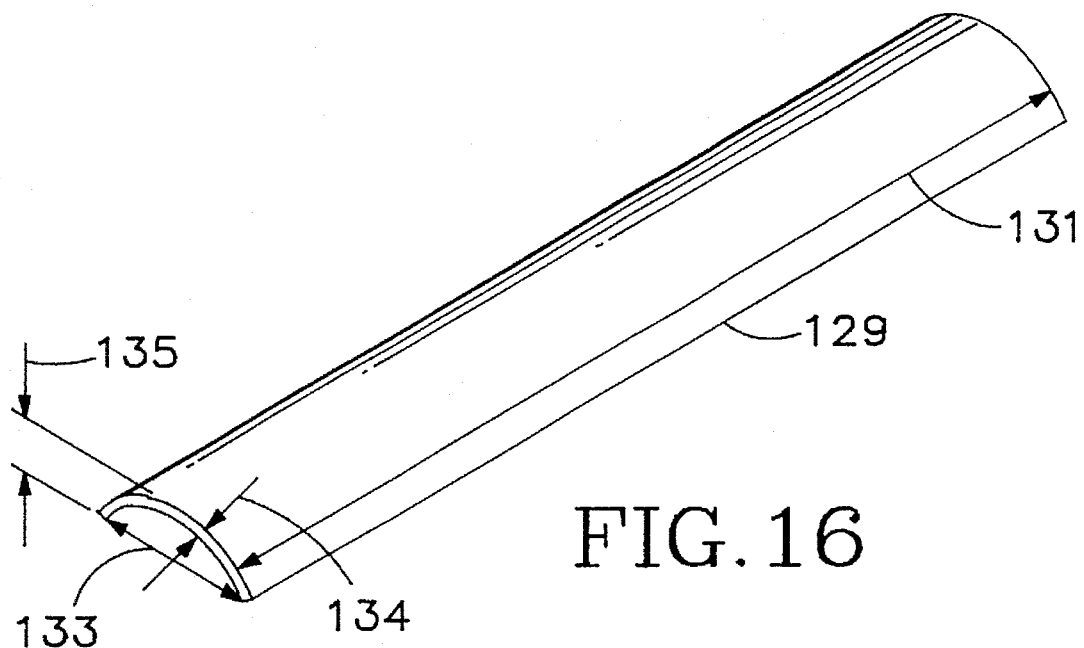
FIG. 16 is a perspective view of an audible signaling device which may be incorporated in the torso portion of the training manikin shown in FIG. 12.

Effective cardiac compression using accepted CPR methods requires that the sternum of a patient be depressed about 1½ to 2 inches (4 to 5 cm) during the chest compression portion of CPR. In order to verify that sufficient chest compression is being accomplished on the training manikin 90 by a trainee, an audible signaling device 129 is embedded in the torso portion 92 of the training manikin 90. As shown in FIG. 16 such an audible signaling device 129 may consist of an elongate arched metal strip embedded in the torso portion 92, for example by being embedded in the foam plastic material of the torso portion 92, so that the metal strip extends transversely across the upper chest area of the torso portion 92. When the chest is sufficiently compressed by a trainee, the metal strip bends, providing an audible click when the original straight, arched form collapses to permit a downward bending of the metal strip. A suitable audible signaling device, or clicker 129, of this type for use in the torso portion 92 is, for example, a strip of metal having a length 131 of five inches (12.7 cm), a width 133 of 0.9 inches (2.3 cm) from edge to edge of its arched form and a height 135 of the arch of about 0.16 inch (0.41 cm). Such a clicker may be made of 1060 stainless steel sheet material having a thickness 134 of, for example, about 0.020 inch (0.05 cm).

The audible signaling device 129 may be embedded in the torso portion 92 as it is molded, or a trough 130 may be provided in the torso portion 92 as it is originally molded. The metal strip can thereafter be placed properly in position and fastened by addition and curing of plastic foam material to surround the metal strip.

Several small holes 136, for example about ¼ inch in diameter, may be provided in the torso portion 92 to let air reenter the body cavity 126 after it has been compressed, or a sufficiently open-cell foam mix may be used to keep the torso portion 92 from acting as a suction cup against a smooth floor 118.

Figure 17:
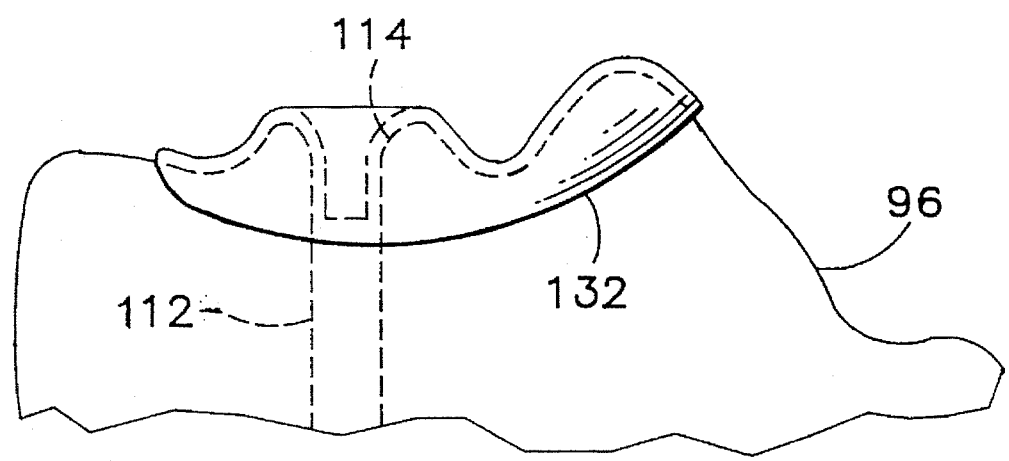
FIG. 17 is a perspective view of a sanitary mask, shown together with part of the head portion of the training manikin shown in FIG. 12.

To facilitate sanitary use of the training manikin 62 by more than one person, it should preferably be used with a sanitary face mask 132, which may be made of molded silicone plastic film molded to conform to a person's facial features and to extend within the mouth of the training manikin 62's head portion 68, as shown in FIG. 17. Such a sanitary face mask 132 may easily be removed yet remains securely enough in place during use of the training manikin 90 to act as a physical barrier to prevent saliva transfer between trainees and thus to protect users of the training manikin 90 against transmission of communicable disease such masks are known for use in actual CPR, and their use with the training manikin 90 also provides training in the use of the mask 132.

To promote acceptance of CPR training for people of different races the head portion 96 may be designed to resemble a member of any race, by providing appropriately shaped facial features and appropriate coloration of the plastic material of which the head portion 96 is manufactured. The connected torso and neck portions 92 and 94 may be manufactured, however, of plastic having a coloration which is not particularly suggestive of any particular race to limit production costs.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A unitary cardio-pulmonary resuscitation training manikin, comprising:
   (a) a head portion defining a mouth opening and a tubular airway extending from said mouth opening rearwardly through said head portion;
   (b) a torso portion;
   (c) a neck portion interconnecting said head and torso portions and allowing said head portion to be tilted between a normal position and a rearwardly tilted position, said head, neck, and torso portions being of a first, larger size, and said torso portion defining a rearwardly open body cavity; and
   (d) a smaller, infant-size manikin contained within said body cavity.

2. The training manikin of claim 1 wherein said head portion has a back side defining an airway opening and said tubular airway extends entirely through said head portion to said airway opening.

3. The training manikin of claim 2, further including an obstructing ball of resilient foam material removably placed in said tubular airway and held in said tubular airway in a compressed configuration to simulate an obstructed airway in a human.

4. The training manikin of claim 2 wherein said airway opening is located on said back side of said head portion so as to be closed by a horizontal surface supporting said training manikin when said head portion is in said normal position, and to be spaced apart from such a horizontal surface when said head portion is in said rearwardly tilted position with respect to said torso and neck portions.

5. The training manikin of claim 1 including a plurality of protuberances defined within said body cavity engaging said infant-size manikin and retaining said infant-size manikin within said body cavity.

6. The training manikin of claim 1 wherein said infant-size manikin includes a head portion having a mouth and a back side and defining a tubular airway extending through said head portion from said mouth toward said back side.

7. The training manikin of claim 1 wherein said torso portion has a back side and wherein said infant-size manikin includes a smaller torso portion having a generally planar back side and wherein said body cavity is shaped to conform to the shape of said infant-size manikin to receive said smaller torso portion of said infant-size manikin snugly within said body cavity and to hold said infant-size manikin with the back side thereof located generally coplanar with said back side of said torso portion of said first, larger, size.

8. The training manikin of claim 1 wherein said infant-size manikin includes a smaller torso portion of molded resilient polymeric foam material having a tough substantially watertight skin surrounding a core portion of lesser density.

9. The training manikin of claim 1 wherein said head portion, torso portion, and neck portion are integrally molded of resilient polymeric micro-cellular foam material having a tough substantially watertight skin layer surrounding a foam core portion of lesser density.

10. The training manikin of claim 1 wherein said neck portion has a front, a pair of opposite lateral portions, and a back side and defines a cavity open toward said back side, said front and lateral portions defining generally a "U" shape facilitating flexure of said neck portion.

11. The training manikin of claim 1, said head portion having a forwardly inclined generally planar back side.

12. The training manikin of claim 11, said torso portion including a back side and said forwardly inclined back side of said head being oriented parallel with said back side of said torso portion when said head is properly located for rescue breathing.

13. The training manikin of claim 1, including a restrictor device located within said tubular airway.

14. The training manikin of claim 1 wherein said neck portion and said head portion include a ball-and-socket joint interconnecting said head portion movably with said neck portion and allowing said head portion to turn from side to side with respect to said torso.

15. The training manikin of claim 14 wherein said head portion has a back side defining an airway opening and said tubular airway extends alongside said ball-and-socket joint and entirely through said head portion to said airway opening.

16. The training manikin of claim 14 wherein said ball-and-socket joint includes a ball portion extending upwardly with respect to said torso and matingly received in a downwardly open socket portion defined in said head portion.

17. The training manikin of claim 14, said torso portion and said neck portion being combined in an integral structure including a ball portion of said ball-and-socket joint and being of molded micro-cellular foam having a tough relatively dense skin and a foam core of lesser density, and said head portion defining a socket portion of said ball-and-socket joint and being of molded micro-cellular foam having a tough relatively dense skin and a foam core portion of lesser density.

18. The training manikin of claim 1, including audible means for producing a recognizable sound in response to application of adequate pressure to said torso portion to effect cardiac compression.

19. The training manikin of claim 18 wherein said audible means includes a clicker of sheet metal embedded in said torso portion.

20. A unitary cardio-pulmonary resuscitation training manikin, comprising:
   (a) a head portion defining a mouth opening and having a back side defining an exterior airway opening, said head portion including a tubular airway extending rearwardly through said head portion and communicating between said mouth opening and said airway opening;
   (b) a torso portion; and
   (c) a neck portion interconnected with said torso portion, said head portion being interconnected with said neck portion through a ball-and-socket joint interconnecting said head portion movably with said neck portion and allowing said head portion to turn from side to side with respect to said torso and to be tilted with respect to said torso portion between a normal position and a rearwardly tilted position, all of said head, torso, and neck portions being of molded foam plastic structure.

21. The training manikin of claim 20, said tubular airway including therein a restrictor including means for providing an audible indication that sufficient air flow is being supplied into said mouth opening of said head portion.

22. The training manikin of claim 20 further including an audible signal device embedded in said torso portion for providing an audible indication that sufficient chest compression is being performed on said training manikin to simulate effective cardiac compression.

* * * * *